INVENTORS.
Robert C. Benton
Roger R. Whitehouse
BY
John W. Gaines
ATTORNEY

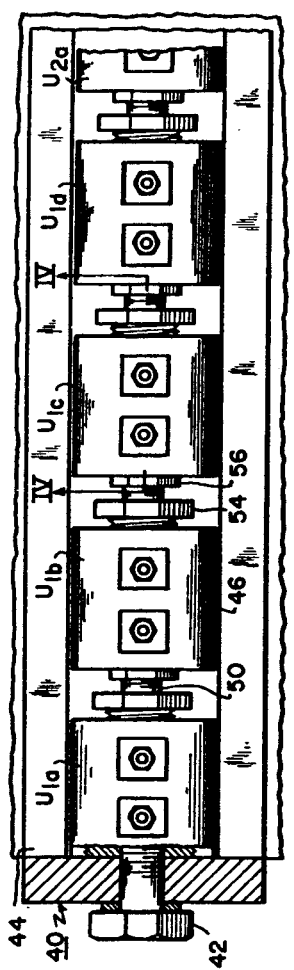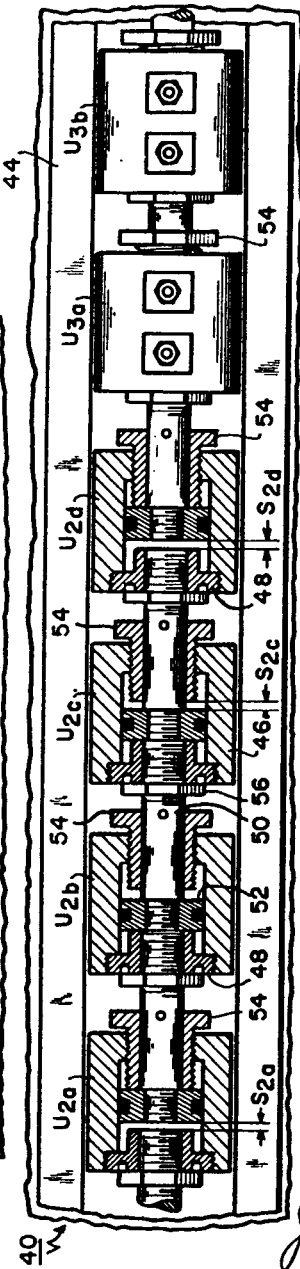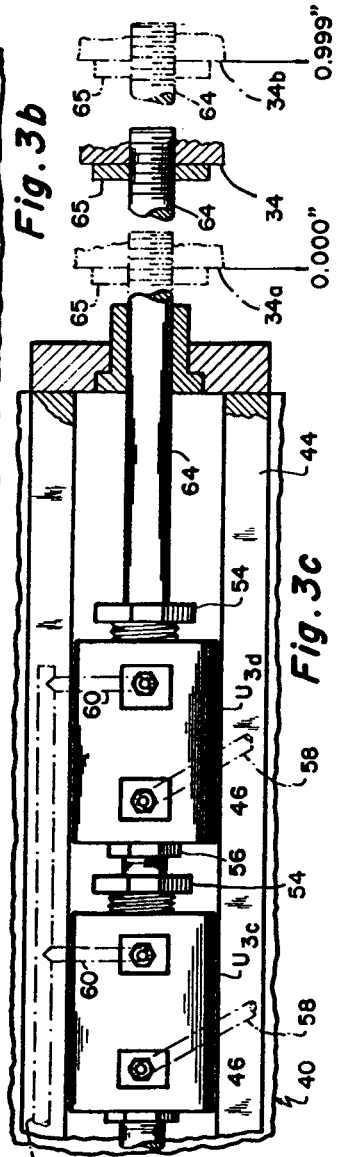

Nov. 3, 1964   R. C. BENTON ETAL   3,154,858
DIFFERENCE GAGE
Filed Aug. 13, 1962   3 Sheets-Sheet 3

INVENTORS.
Robert C. Benton
Roger R. Whitehouse
BY John W. Gaines
ATTORNEY

United States Patent Office 3,154,858
Patented Nov. 3, 1964

3,154,858
DIFFERENCE GAGE
Robert C. Benton and Roger R. Whitehouse, State College, Pa., assignors to Centre Circuits, Inc., State College, Pa., a corporation of Pennsylvania
Filed Aug. 13, 1962, Ser. No. 216,653
5 Claims. (Cl. 33—125)

The present invention relates to a difference gage of binary-decimal type for accurately presetting the position of automatic, table stopping pawls, or other table or carriage stopping mechanisms, and the like. The gage itself is automatic, presetting the location of the stopping device accurately to a thousandth part, or a ten-thousandth part, etc., within some major unit of movement such as one inch or one-half inch, for example.

The tables and carriages primarily contemplated are of a type adapted to support a work piece and having universal rectilinear movement along two coordinate axes. The instant gage forms part of the control apparatus for positioning the table by orderly establishment of a sequence of large and small increment settings which are of a cumulative effect enabling the work piece to be stopped at precisely the right decimal point or points for machining as desired. These points are automatically read from binary code perforations and a programmer controls the operating sequence of each machining cycle.

The stopping device is actuated to sense the relative position of the table at the right time whereupon it operates to bring the table to a stop at the gaged point, all referenced with respect to the stopping device.

It is an object of the present invention, in comparison to prior gage rod mechanism, to avoid some of the exactitude of machining which is characteristic of the prior mechanisms. Heretofore, gages have been proposed of the decade-rod type and machining of each of the ten rod elements to the customary exact decimal lengths has created an added expense; the present binary-controlled, difference system affords the same or higher accuracy using more nominal lengths of the gaging parts and a minimum of close tolerances of manufacture. Moreover, by adapting the instant gage units to direct response from binary coded signals, we find that the customary number of ten units is materially reduced through use of combination actuation of fewer-than-ten units, thus reducing the number of parts and expense.

More particularly, we provide a consecutive series of binary sets of cylinder type gage units. Each cylinder carries a plunger and moves the plunger between extended and retracted positions so as to yield a measurable difference in the overall length effective with each of the units. Their absolute lengths in accordance with the present invention are relatively immaterial, but the gage units are connected in tandem so as to afford an exact decimal difference when individually actuated or not.

A further object therefore is to provide a gage consisting of tandem connected sets of cylinders each with a carefully limited, decimally accurate stroke for automatically setting or presetting the position of an adjustable device.

It is another object of the invention to provide a consecutive series of binary gage units which in one simultaneous cycle of movement aggregate to produce the decimal setting of an adjustable device, the complete cycle occurring practically instantaneously.

Another object is the provision in a gage system, of a four-unit set of gaging elements productive, through selectible combinations in their actuation, of a decade or more of settings. To achieve a decimal setting with the figure complete to a given number of places, we merely provide that number of sets of the units each reading to a different decimal place and thus aggregating the complete figure.

Further features, objects and advantages will either be specifically pointed out or become apparent when, for a better understanding of the invention, reference is made to the following description taken in conjunction with the accompanying drawings which form a part hereof and in which:

FIGURES 3a, 3b and 3c show consecutive portions of the whole gage in FIGURE 2, viewed in the direction of the lines III—III of FIGURE 2;

FIGURE 4 is a side elevational view of a detail taken in section along the lines IV—IV of FIGURE 3a;

Figure 1:
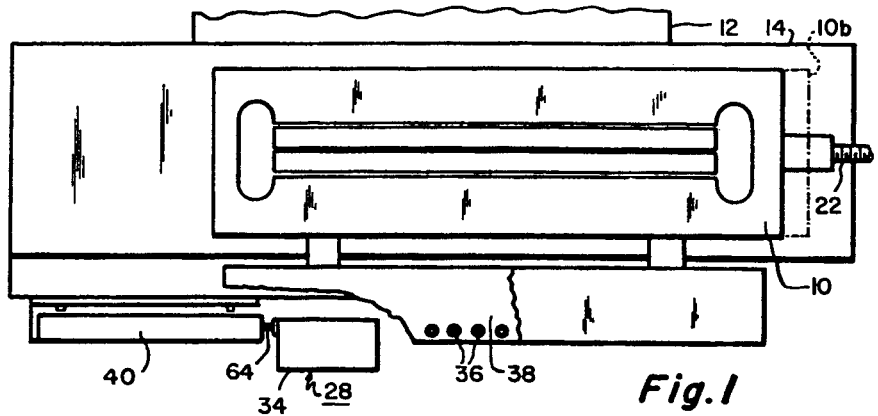
FIGURES 1 and 2 are top plan and side elevational views, respectively, of the workpiece carrying portions of a machine tool.
Figure 2:
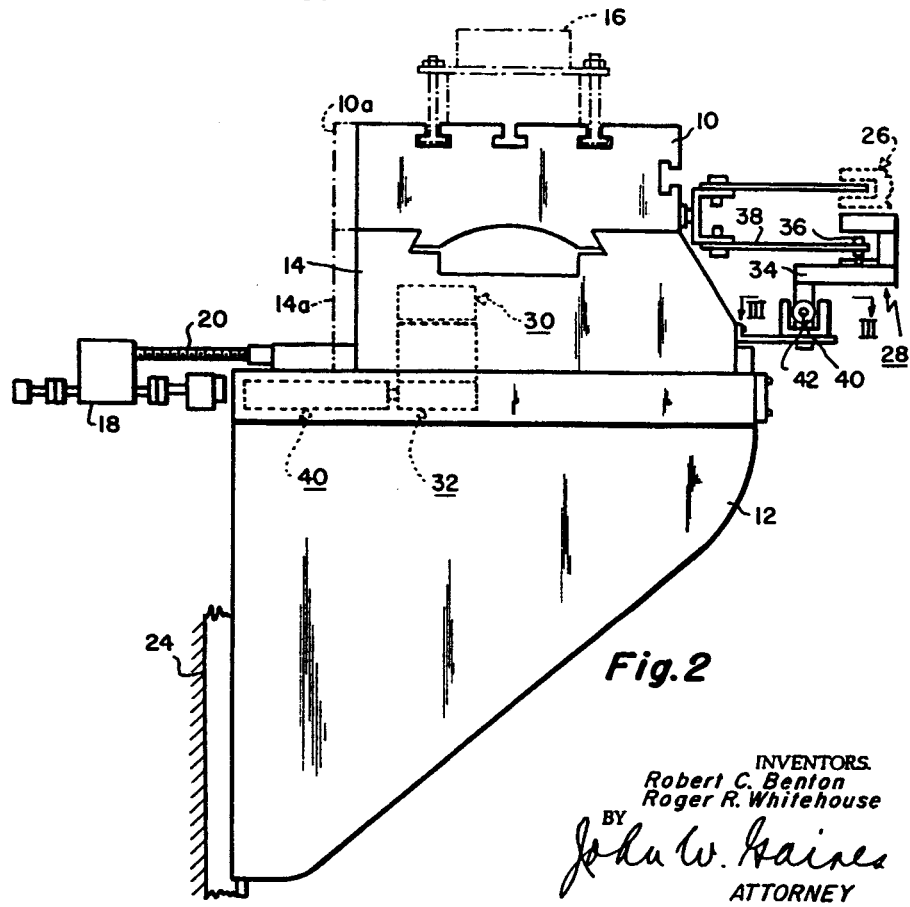

More particularly in FIGURES 1 and 2 of the drawings, the workpiece carrying portion of a machine tool is shown, including a longitudinally movable table 10, a curved knee 12, and a saddle 14 which is supported by the knee 12 and which supports the table 10. The table 10 carries a workpiece indicated by the dotted lines 16 adapted to be machined by drilling, milling, etc. depending on the particular machine tool.

A dual motor drive 18 operates a lead screw 20 for controlling horizontal movement of the saddle 14 so that the table and saddle move conjointly into a position shown by the dotted lines 10a and 14a and other positions along one axis. A similar drive and a lead screw 22 (FIGURE 1) control the position of the table 10 so as to move it from the position shown by the dotted lines 10b into the position desired along the table axis. The knee 12 is also adjusted by appropriate means along a set of vertical ways carried by the machine and generally indicated at 24, all for the purposes generally set forth in copending Benton Binary Decimal Gage application SN 216,617 filed Aug. 13, 1962.

Briefly, as stated in said application, an automatic control 30 operates the dual motor drive 18 and this drive is stopped in response to a positioning control 32. Along the perpendicular horizontal axis, an automatic control 26 operates the drive for the associated lead screw 22 so as to move the table alone, the table being stopped in response to a positioning control 28.

The positioning control 28 includes a stopping device 34 which is activated by the automatic control 26 at the right time so as to sense the right mark element or indexing point 36 on a panel 38 carried by the table 10. With these points being spaced apart one-inch center to center, relatively large increments of movement are closely controlled purely by selection automatically of the appropriate element 36. The stopping device 34 is carried by the instant gage 40 and consists of a carriage stopping mechanism of conventional type or else having special construction, for example, a null sensor type generally as shown in copending Benton application for Table Stopping Device Having Null Sensor SN 216,655, filed August 13, 1962. The controls 26 and 28 form no per se part of the present invention.

Novelty is believed to reside in the gage 40 of the positioning control 28 and in a like gage 40 of the other positioning control 32 as will now be explained.

The gage 40 consists of a difference gage comprising a consecutive series of binary sets of cylinder units generally designated U. In FIGURES 3a, 3b and 3c, these units U are given different subscripts to distinguish them. More particularly in FIGURE 3a, the first or inner set of units is shown, wherein the unit U1a has a stroke of 0.001 inch, unit U1b has a stroke of 0.002 inch, unit 1c has a stroke of 0.004 inch, and unit 1d has a stroke of 0.008 inch. The units are individual, plunger-carrying cylinders of which the unit U1a is secured by an anchoring bolt or stop device 42 to the end of the box 44 forming the frame of the gage. They are tandem-connected, there being three sets of four units apiece.

The gage units U of the second set are the four cylinders shown in cross section in FIGURE 3b. From the cross section it can be seen that each unit U consists of a cylinder 46 which is closed at one end by a rear threaded bushing 48. A piston rod 50 is carried by a piston 52 slidable within the cylinder 46 and extends through a front threaded bushing 54 carried at the front end of the cylinder 46.

Each piston rod 50 is threaded into the rear bushing 48 of the next cylinder to form a tandem-connected arrangement and each is secured by a lock nut 56. The front bushing 54 of cylinder U2b is adjusted to give the piston 52 an accurate stroke of 0.020 inch. The front bushings 54 of these other cylinders shown in cross section are adjusted so that their respective strokes are S2a=0.010 inch, S2c=0.040 inch and S2d=0.080 inch.

Figure 4:
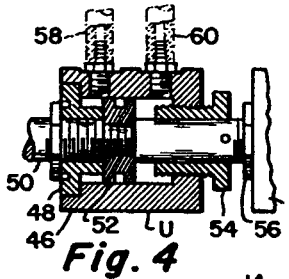

The cylinders of the third set are shown unsectioned in FIGURES 3b and 3c. The bushings 54 are adjusted for cylinder strokes as follows: 0.100 inch for cylinder U3a, 0.200 inch for cylinder U3b, 0.400 inch for cylinder U3c, and 0.400 inch for cylinder U3d. Each cylinder is supplied at the rear end with input air through a reader-supplied line indicated by the dotted lines 58 in FIGURE 3c; each cylinder is supplied with lower pressure air at the forward end through short conduits indicated by the dotted lines 60 of FIGURE 3c which are fed from a common manifold 62. In this way the cylinders U are selectively extensively and retractively moved as desired, another operative view in cross section of a typical cylinder U appearing in FIGURE 4. The air line 58 is shown communicating with the cylinder 46 through an inlet-outlet port in the cylinder wall at the rear end, and the conduit 60 is shown communicating with the cylinder 46 through an inlet-outlet port in the cylinder wall at the front end.

In FIGURE 3c the front end of the forward-most cylinder U3d has a long protruding piston rod 64 which is connected to part of the sensor type stopping device 34 of the positioning control 28. The rod 64 is the immediate member which accomplishes the so-called small, increment positioning of the device 34. A threaded connection at the end of the piston rod 64 and a lock nut 65 provide for adjustment of the stopping device 34 so that it initially registers at a zero mark when all of the cylinders U are retracted. From this zero position, shown by the dotted lines 34a, the device 34 can be automatically moved and stopped by the gage at any intervening position up to and including a terminal position indicated by the dotted lines 34b which marks a point or station 0.999 inch away from the zero reference mark. In this latter position the following cylinders only are actuated to their extended position: cylinder units Nos. U1a, U1d, U2a, U2d, U3a, U3c, and U3d. FIGURE 3b illustrates this particular setting of the second set of cylinders.

Figure 7:
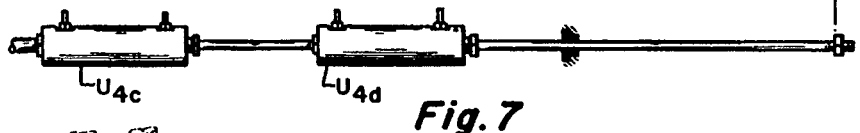

It is apparent that the cylinders U produce every decimal in 0.001 inch graduations through appropriate binary combinations, the FIGURE 7 for example being achieved on the basis of 1 plus 2 plus 4 equals 7. It is not essential however that the relative strokes as between cylinders of the same set be limited to the one-two-four-eight or two-four-four proportions so far considered; the adjustable bushings 48 and 54 allow the user of the present device to adjust for wear or to re-select from other satisfactory proportions and orders of strokes which in proper combination will equally well cover the decimal range.

Figure 5:
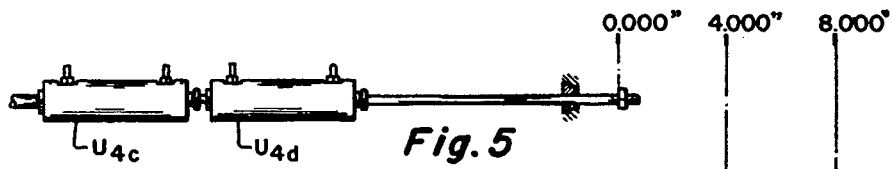
FIGURES 5, 6 and 7 are similar to FIGURE 4 but show a modification of the invention providing a longer stroke.
Figure 6:
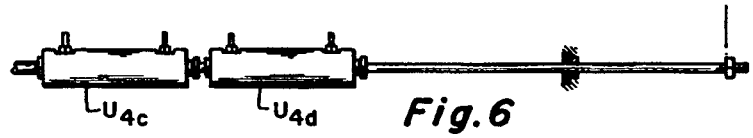

It is appreciated that the full or whole unit of travel thus divided into fractions can consist of half an inch, one inch, one foot, etc. and the divisions thereof are made decimal fractions or other fractions as convenient. In FIGURES 5, 6 and 7, the end cylinders U4c and U4d of a longer stroke gage are shown, each contributing a submultiple of a foot. With the cylinders retracted, their contribution to the final reading of the entire tandem gage (not shown) would be 0.000 inch. If only the cylinder U4d is extended (FIGURE 6), their contribution or difference afforded by the two cylinders, assuming each has a four inch stroke, would be 4.000 inches. Extension of the cylinders U4c and U4d so that each affords its full difference reading of 4 inches causes their contribution to the full travel to amount to be 8.000 inches, in accordance with FIGURE 7.

Figure 8:
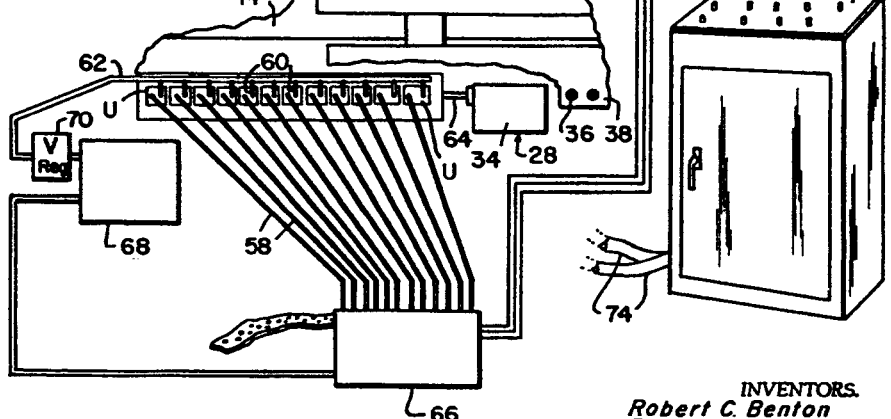
FIGURE 8 is a schematic showing of a numerical control system including our gage.

In FIGURE 8, the tape reader 66 of a binary-type numerical control system selectively applies the air to the cylinders U, which air the reader receives from an air supply source 68. A regulator 70 connected to the source 68 supplies low pressure air through the manifold 62 to the front end of all cylinders U. A programming console 72 has various connections 74 to the dual motor drives for the table 10 and through a control conduit 76 controls the sequence of operation and cycles the reader 66.

In operation, the tape reader 66 is operated by the console 72 to advance to a new reading on the numerical control tape. Owing to binary code perforations in the tape, the reader 66 selectively supplies air into appropriate lines 58 with which the perforations in the tape register, thereby overcoming the low pressure maintained in the front ends of selected cylinders and causing these cylinders to extend. The device 34 is thus pneumatically preset into some solid line position indicated by the solid lines 34 of FIGURE 3c, enabling the positioning control to automatically stop the table 10 in the proper terminal position. Because the air is supplied simultaneously to the selected cylinders, the presetting operation is practically instantaneous, particularly because of the short stroke to which each cylinder is limited.

The machining operation is performed when the table is stopped, whereupon the console 72 causes the tape reader to advance to another reading. During this interim, pressure is relieved or reduced in the lines 58 and the air supplied from the manifold 62 immediately resets all cylinders to a zero position, i.e., the retracted position.

When the tape reader reaches a new reading on the tape, the cycle is repeated for another presetting.

As a numerical example, if it is desired to stop the table 10 of FIGURE 1 when the table has advanced the workpiece for machining to a point 8.090 inches along one axis, all cylinder units U are retracted except two. The unit U2a and the unit U2d are air-actuated into their solid line positions of FIGURE 3b. The automatic control 26 monitors the table movement and at the point where the element 36 at the 8-inch mark approaches registry with the positioning control 28, the automatic control 26 activates the stopping device 34. The stopping device 34 senses exact registry with the element at the 8-inch mark and stops the table. The stopping point is consequently at the point 8.090 inches, representing the cumulative effect of the large increment of 8 inches plus additive small increments of the actuated cylinders U2a and U2d. Thus the stroke S2d is mechanically added to the stroke S2a, displacing the device 34 a desired total amount 0.090 inch from its zero reference point.

Variations within the spirit and scope of the invention described are equally comprehended by the foregoing description.

What is claimed is:

1. In a numerical control system, a binary code reader having a binary pneumatic output consisting of a plurality of air lines, a sensor for sensing a reference point on a moving machine element, a positioning device for positioning the sensor into a precisely adjusted position relative to the path of the reference point, said positioning device comprising a consecutive series of binary sets of gage units arranged in tandem and each unit consisting of a plunger carrying cylinder, means through which a relatively low air pressure is introduced into corresponding ends of the cylinders, and means connecting the binary pneumatic output lines to the other ends of the cylinders for simultaneously shifting selected plungers, each cylinder characterized by a relatively inexact absolute length and provided with a precise means of adjustment for precalibration and wear, said means of adjustment for each cylinder of a set comprising a threaded bushing adjusted so as to yield a difference between extended and retracted positions of the plunger reading to one decimal place which is a different decimal place than yielded from the units of the other sets, whereby the binary units of each set combine so that they aggregate as a portion of the decimal reading and in terms of only the one decimal place, the number of sets of gage units yielding a total gage reading of the positioning device complete to that number of decimal places desired.

2. The invention of claim 1, wherein the unit at one end of said series is fixed to a stationary part for anchoring the positioning device, and the unit at the other end of the series is affixed to the sensor, the cylinder of each unit being affixed by a locked threaded connection to the plunger of the immediately preceding cylinder whereby the selectively shifted plungers operate simultaneously, with double action, and under power both ways.

3. In a numerical control system, a binary code reader having a binary fluid output consisting of a plurality of fluid lines, a sensor for sensing a reference point on a passing machine element, a positioning device for precisely adjusting the sensor relative to the path of the reference point for utility in controlling the machine element, said positioning device comprising a consecutive series of binary sets of tandem gage units each consisting of a plunger carrying cylinder, means through which a relatively low fluid pressure is introduced into corresponding ends of the individual cylinders, and means connecting the binary fluid output lines to the other ends of the cylinders for simultaneously shifting selected plungers, each cylinder characterized by a relatively inexact absolute length and provided with a precise means of adjustment for precalibration and for wear, the means of adjustment for each cylinder of a set constituting a threaded bushing adjusted so as to yield a difference between extended and retracted positions of the plunger reading to one decimal place which is a different place than yielded from the units of the other sets, whereby the binary units of each set combine so that they aggregate as a portion of the decimal reading and in terms of only one decimal place, the number of sets of units yielding a total gage reading of the positioning device-complete to that number of decimal places desired, the units at one end of the series being fixed to a stationary part to anchor the positioning device, and the units at the other end of the series being affixed to the sensor which is adjusted by the positioning device, the cylinder of each unit being affixed to the plunger of the immediately preceding cylinder by a locked threaded connection whereby the selected plungers operate always in unison, with double action, and under power both ways.

4. In positioning apparatus, a sensor for sensing a reference point on a moving machine element, and a positioning device for positioning the sensor into a precisely adjusted position relative to the path of the reference point, said positioning device comprising a consecutive series of binary sets of tandem gage units, each comprising a plunger-carrying cylinder, said units having inlet-outlet ports through which a relatively low air pressure is introduced into corresponding ends of the cylinders, and further having inlet-outlet ports through which operating air signals are introduced to the other ends of the cylinders for simultaneously shifting selected plungers, each cylinder being characterized by a relatively inexact absolute length and provided with a precise means of adjustment for precalibration and wear, the means of adjustment for each cylinder of a set consisting of a threaded bushing adjusted to yield a difference between extended and retracted positions of the plunger reading to one decimal place which is a different decimal place than yielded from the units of the other sets, whereby the binary units of each set combine so that they aggregate as a portion of the decimal reading and in terms of only the one decimal place, the units at one end of the series being fixed to a stationary part to anchor the positioning device, and the units at the other end of the series being operatively affixed to and effective to position the sensor, the cylinder of each unit being affixed to the plunger of the immediately preceding cylinder by a locked threaded connection whereby the selected plungers operate always in unison, with double acting cylinder action, and under power both ways.

5. The invention of claim 4, which sets of units characterized in that each set comprises four, plunger-carrying cylinders and, in a majority of which sets, the strokes of the first, second, third, and fourth plungers are different proportionally in length in the order of one, two, four, and eight, respectively, thereby being capable in appropriate combinations to yield all decimal readings of one place.

References Cited in the file of this patent

UNITED STATES PATENTS

| | | |
|---|---|---|
| 2,908,978 | Knosp | Oct. 20, 1959 |
| 2,932,088 | Knosp | Apr. 12, 1960 |

FOREIGN PATENTS

| | | |
|---|---|---|
| 25,785 | Finland | Mar. 18, 1953 |

OTHER REFERENCES

"Johansson Gage Blocks and Accessories" (catalog), page 29 relied on.